UNITED STATES PATENT OFFICE.

AUGUST ANDER AND FREDERICK T. McGUIRE, OF SEATTLE, WASHINGTON.

PROCESS FOR MANUFACTURING TAILORS' CHALK.

1,384,375. Specification of Letters Patent. Patented July 12, 1921.

No Drawing. Application filed December 9, 1919. Serial No. 343,463.

*To all whom it may concern:*

Be it known that we, AUGUST ANDER and FREDERICK T. McGUIRE, citizens of the United States, residing at Seattle, in the county of King and State of Washington, have invented certain new and useful Improvements in Processes for Manufacturing Tailors' Chalk, of which the following is a specification.

This invention relates to a process for manufacturing tailors' chalk consisting substantially of clay, an oleaginous substance and a coloring material.

The object of the invention is to produce an article of this character possessing strength, toughness and exceptionally good marking qualities.

In carrying out our invention plastic clay, such as is conventionally known as pipe clay, is thoroughly mixed with any suitable pigment or coloring matter, the mixture molded or pressed into relatively thin cakes, and then slowly dried under a mild heat. After being thus dried, the cakes are submerged in an oil, either vegetable or mineral, and after becoming saturated therewith the cakes are again dried.

The use of clay in the manufacture of tailors' chalk is not in itself new, and as hitherto employed produces an article which is extremely fragile, but by the use of oil to saturate the clay, subsequent to molding and drying, the same is rendered quite tough and more serviceable. The oil, moreover, by being absorbed by the clay material causes chalk to be softer and less injurious to cloth.

What we claim, is—

The process for manufacturing tailors' chalk, consisting in mixing a plastic clay substance with a coloring matter, forming the mixture into cakes, drying the latter under a mild heat, submerging the dried cakes in a liquid oleaginous substance to become saturated therewith, and finally drying the same.

Signed at Seattle, Washington, this 1st day of December, 1919.

AUGUST ANDER.
FREDERICK T. McGUIRE.

Witnesses:
ELIZABETH JOHNSON,
PIERRE BARNES.